(12) United States Patent
Nicholson et al.

(10) Patent No.: US 8,091,647 B2
(45) Date of Patent: Jan. 10, 2012

(54) MEANS OF PREVENTING MARINE FOULING OF SUBSEA CONNECTORS

(75) Inventors: Joseph A. Nicholson, Broughton-in-Furness (GB); Gareth B. Eccles, Ulverston (GB); Daryl H. Love, Millom (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 468 days.

(21) Appl. No.: 12/195,743

(22) Filed: Aug. 21, 2008

(65) Prior Publication Data

US 2009/0056950 A1  Mar. 5, 2009

Related U.S. Application Data

(60) Provisional application No. 60/969,181, filed on Aug. 31, 2007.

(51) Int. Cl.
*E21B 23/00* (2006.01)

(52) U.S. Cl. ...... 166/368; 166/338; 166/344; 405/211.1

(58) Field of Classification Search .......... 166/338, 166/339, 368, 341, 344, 356, 378, 381, 385, 166/386; 405/211.1, 216

See application file for complete search history.

(56) References Cited

U.S. PATENT DOCUMENTS

| 6,158,093 A | 12/2000 | Bergeron |
| 6,417,457 B1 | 7/2002 | Aasbo et al. |
| 6,607,826 B1 * | 8/2003 | Hatch ........................ 428/343 |

FOREIGN PATENT DOCUMENTS

| EP | 0985759 A2 | 3/2000 |
| GB | 2152769 A | 8/1985 |
| GB | 2426266 A | 11/2006 |
| JP | 3056560 A | 7/1989 |
| JP | 6271413 A | 3/1993 |
| JP | 8151512 A | 11/1994 |
| JP | 9012414 A | 6/1995 |
| JP | 11012477 A | 6/1997 |
| JP | 2001089577 A | 9/1999 |
| WO | 0144209 A1 | 6/2001 |

* cited by examiner

*Primary Examiner* — Thomas Beach
*Assistant Examiner* — Matthew Buck
(74) *Attorney, Agent, or Firm* — Rodney Warfford; Chadwick Sullivan

(57) ABSTRACT

The present embodiment of the invention relates to an apparatus and method for using components in a subsea assembly formed from a raw polymer material combined with a marine growth inhibitor material.

16 Claims, 2 Drawing Sheets

MEANS OF PREVENTING MARINE FOULING OF SUBSEA CONNECTORS

RELATED APPLICATIONS

This application claims the benefit under 35 U.S.C. §119 (e) to U.S. Provisional Patent Application No. 60/969,181, entitled "MEANS OF PREVENTING MARINE FOULING OF SUBSEA CONNECTORS," which was filed on Aug. 31, 2007, and is hereby incorporated by reference in its entirety.

TECHNICAL FIELD

The present application relates generally to enhancements in subsea assemblies, and in particular to connectors that are used with subsea equipment that require communication and power transmission.

BACKGROUND

Subsea oil and gas equipment that require communication and power transmission often have connectors that can be assembled and disassembled underwater. Remotely Operated Vehicles ("ROVs") are normally used to connect a removable connector to a fixed connector on the subsea equipment. ROVs are operated by pilots on surface ships using joystick controls to manoeuvre the ROV and operate a manipulator arm to allow connection or disconnection of the connectors. The pilots rely on strategically placing subsea cameras to view the ROV operation and gain the feedback necessary to ensure each operation is effectively controlled.

The connector design can have several key features to allow a successful operation. One feature is the connector achieving accurate alignment when mating, usually by providing close fitting diametric constraints and an orientation feature. Another feature includes built-in compliance, which is beneficial if the connectors can be aligned quickly and accurately. Still, another feature is some form of latch device which should ideally indicate when the connector has been fully mated and is latched together. Latching the connectors together can form a watertight seal with each other. A positive latch indication system is therefore desirable.

Traditionally, ROV connectors are manufactured from noble steel materials such as titanium and super duplex stainless steel. These materials can suffer from corrosion. The materials are also expensive to procure and fabricate and can be affected by the build-up of marine growth. Marine growth can cause fouling and is often more pronounced in warm shallow waters.

Accordingly, there exists a need for systems and a method for producing several types of components for subsea applications out of materials that resist marine fouling.

SUMMARY

The present embodiment of the invention relates to an apparatus and method for using components in a subsea assembly formed from a raw polymer material combined with a marine growth inhibitor material. According to some embodiments of the present invention, several components of a subsea connector such as a plug assembly in conjunction with a receptacle connector is formed by injection molding using a raw polymer material and the marine growth inhibitor material mixture.

Other or alternative embodiments of the present invention will be apparent from the following description, from the drawings, and from the claims.

BRIEF DESCRIPTION OF THE DRAWINGS

The manner in which these objectives and other desirable characteristics can be obtained is explained in the following description and attached drawings in which.

It is to be noted, however, that the appended drawings illustrate only typical embodiments of this invention and are therefore not to be considered limiting of its scope, for the embodiments may admit to other equally effective embodiments.

DETAILED DESCRIPTION

In the following description, numerous details are set forth to provide an understanding of the various embodiments of the present invention. However, it will be understood by those skilled in the art that those embodiments presented may be practiced without these details and that numerous variations or modifications from the described embodiments may be possible.

In the specification and appended claims, the terms "connect", "connection", "connected", "in connection with", and "connecting" are used to mean "in direct connection with" or "in connection with via another element"; and the term "set" is used to mean "one element" or "more than one element". As used herein, the terms "up" and "down", "upper" and "lower", "upwardly" and "downwardly", "upstream" and "downstream"; "above" and "below"; and other like terms indicating relative positions above or below a given point or element are used in this description to more clearly described some embodiments of the invention. However, when applied to equipment and methods for use in wells that are deviated or horizontal, such terms may refer to a left to right, right to left, or other relationship as appropriate. Moreover, the term "sealing mechanism" includes: packers, bridge plugs, downhole valves, sliding sleeves, baffle-plug combinations, polished bore receptacle (PBR) seals, and all other methods and devices for temporarily blocking the flow of fluids through the wellbore. Furthermore, the term "treatment fluid" includes and fluid delivered to a formation to stimulate production including, but not limited to, fracing fluid, acid, gel, foam or other stimulating fluid.

Generally, various embodiments of the present invention relate to the use of structural composite polymers or plastics combined with a marine growth inhibitor material in the fabrication of subsea connectors for such uses including electrical, fibre optic or hydraulic communication.

Figure 1:
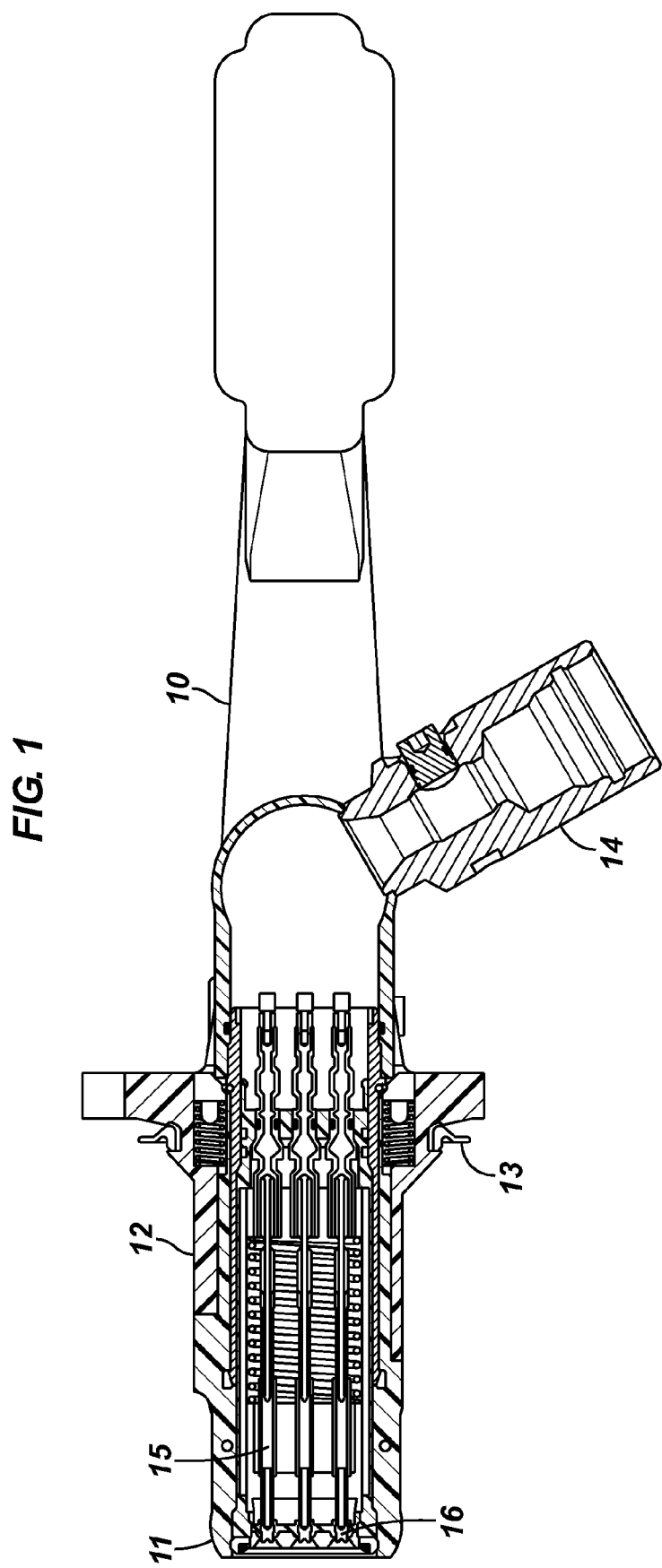
FIG. 1 illustrates a cross sectional view of a subsea plug assembly comprising embodiments of the present invention.
Figure 2:
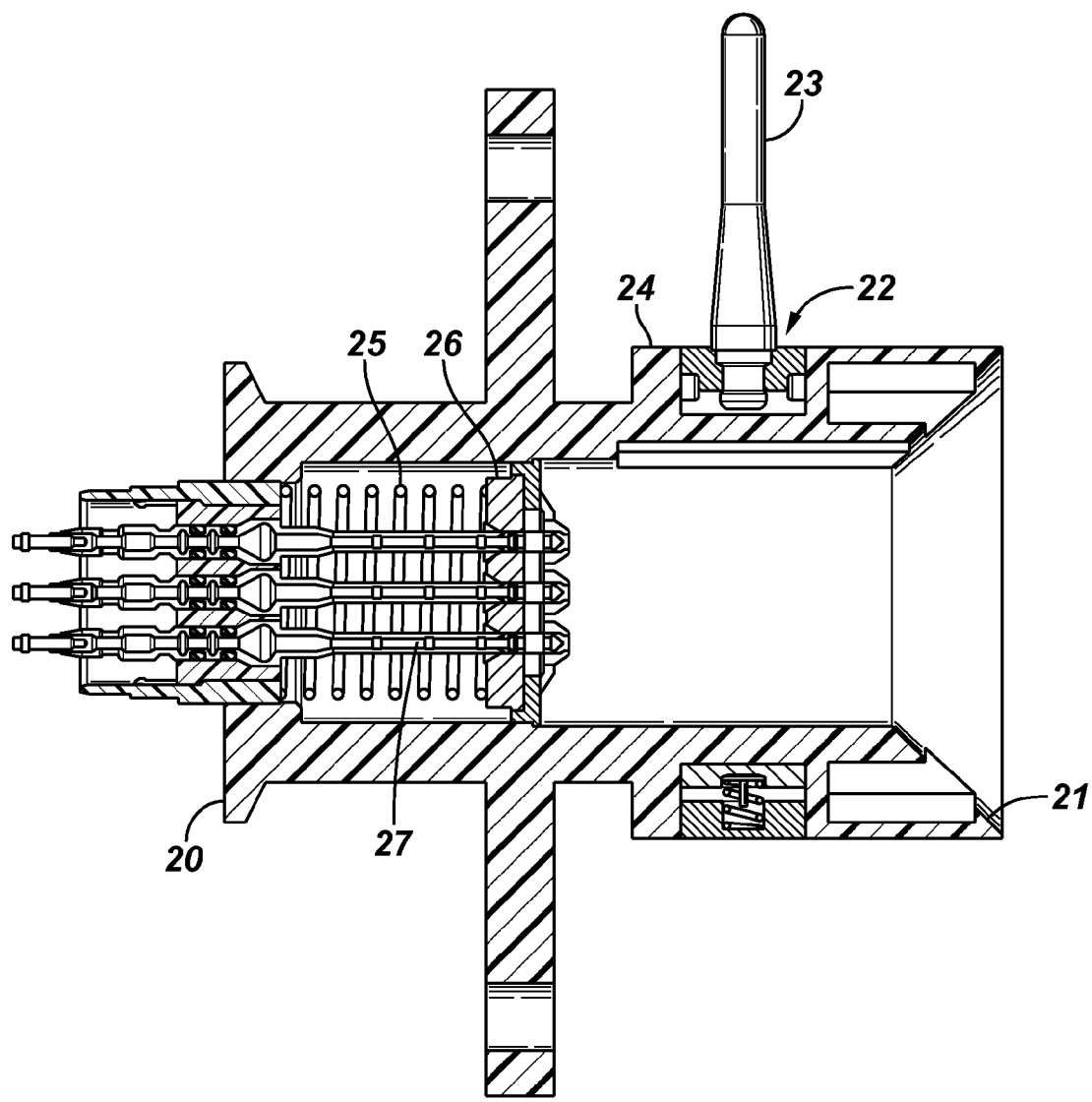
FIG. 2 illustrates a cross sectional view of a receptacle connector comprising embodiments of the present invention.

In particular, one embodiment of the invention refers to the application of the ROV intervention. An ROV plug connector 10 is represented in FIG. 1. An ROV plug receptacle 20 is represented in FIG. 2. The plug connector 10 is inserted into the plug receptacle 20 through the guide cone 21. As the plug connector 10 is pushed inward the plug nose 11 will push the wiper assembly 26 back against the wiper spring 25 thereby exposing the male electrical connections 27. As the plug connector 10 moves into the plug receptacle 20 the male electrical connections 27 will connect into the female electrical connections 16 located in the plug module assembly 15.

An embodiment of the apparatus might include various connector plug 10 components and various plug receptacle 20 components molded with a mixture of reinforced composites and anti-fouling agent. The components that are composed of the mixture for the plug connector 10 may include, but are not limited to, the plug nose 11, the release ring 12, and the cable termination 14. The components for the plug receptacle 20 that are composed of the mixture may include, but are not limited to, the guide cone 21, the body assembly 24, and the latch 22.

By utilizing this polymeric structure in connectors, such as ROV plug connectors 10, the connector plug receptacles 20 have a latch 22 that disposes around a latch indicator 23 to provide the ROV pilot with an indication when the plug connector 10 is latched. Therefore, it is important to prevent marine growth interfering with the action of the latch as it opens and closes during the mating or disconnecting sequence.

The plug connector 10 utilizes reinforced high strength thermoplastic which is injection moulded over metal inserts. The reinforced composite plastic is preferably strong and durable with good chemical stability. The anti-fouling agents are added to the polymeric material to prevent marine organism attack and growth on the connector housings, bodies, and latching mechanisms.

In an embodiment the connector is fabricated by injection molding using high performance thermoplastics such as semi-crystalline polyphenylene sulphide (PPS), Polyoxymethylene (POM or Acetal) or Polyetheretherketone (PEEK) with a long strand (for example, a 10 mm long strand) reinforcement material such as glass, Aramid, carbon fibre, stainless steel strands, or so forth. Long strand fibres impart greater toughness and strength to the part, particularly at low temperatures (for example, −30 to −40° C.) compared to short strand fibres.

The raw polymer material can be compounded with an additive such as a chemical salt, metallic salt complex, inorganic salt complex, or so forth, which inhibits marine growth. The addition of these chemical salts into the base polymer granules for processing should not reduce the mechanical or structural strength of the base polymer. Instead, the chemical salts impart a chemical resistance to marine growth and bacteria. The anti-fouling agents will also allow the plug and receptacle close fitting diameters to be maintained from marine growth, even though a lip seal 13 on the ROV connector plug 10 is employed to prevent entry of marine organisms.

An embodiment of the method of manufacturing the anti-fouling components might include a standard injection molding method currently used in many applications. The process might involve mixing 10 mm long pieces of glass with PPS and an anti-fouling agent currently used in other applications such as boating. The heterogeneous mixture, at various ratios, is in a granular form and is placed in a hopper for a standard injection molding machine. The injection molding machine melts the heterogeneous mixture to form a liquid homogeneous combined comprising the three types of materials mentioned above. This molten mixture is then injected into a mold for the piece of interest to be used later on. Once the molten mixture cools and solidifies, the finished product could be removed from the mold. Then, after removing the excess material due to the injection molding process, the piece is ready for use.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. An apparatus for use in a subsea location comprising:
 a component of a subsea assembly being formed from a raw polymer material combined with a marine growth inhibitor material and a reinforcement material; wherein the raw polymer material comprises a thermoplastic material selected from the group consisting of:
 a semi-crystalline polyphenylene sulphide;
 a polyoxymethylene; and
 a polyetheretherketone.

2. The apparatus of claim 1, wherein the reinforcement material is one selected from the group consisting of:
 glass fiber;
 para-aramid synthetic fiber;
 carbon fiber; and
 stainless steel strands.

3. The apparatus of claim 1, wherein the marine growth inhibitor material is one selected from a group consisting of:
 a chemical salt based compound;
 a metallic salt based compound; and
 an inorganic salt complex based compound.

4. The apparatus of claim 1, wherein the subsea assembly is one selected from the group consisting of:
 a subsea electrical connector;
 a subsea fiber optic connector;
 a hydraulic communication connector; and
 a remotely operated vehicle intervention panel.

5. The apparatus of claim 1, wherein the subsea assembly is a plug assembly.

6. The apparatus of claim 5, wherein the component of the plug assembly is one selected from the group consisting of:
 a plug body assembly;
 a plug latch release ring; and
 a cable termination.

7. The apparatus of claim 1, wherein the subsea assembly is a receptacle connector.

8. The apparatus of claim 7, wherein the component of the receptacle connector is one selected from the group consisting of:
 a receptacle latch;
 a receptacle liner sleeve; and
 a receptacle body assembly.

9. A method of manufacturing a component of a subsea assembly for use in a subsea location comprising the steps of:
 combining a raw polymer material with a marine growth inhibitor material and a reinforcement material; wherein the raw polymer material comprises a thermoplastic material selected from the group consisting of:
 a semi-crystalline polyphenylene sulphide;
 a polyoxymethylene; and
 a polyetheretherketone; and
 molding said combination of materials into a component.

10. The method of claim 9, wherein the reinforcement material is one selected from the group consisting of:
 glass fiber;
 para-aramid synthetic fiber;
 carbon fiber; and
 stainless steel strands.

11. The method of claim 9, wherein the marine growth inhibitor material is one selected from the group consisting of:
 a chemical salt based compound;
 a metallic salt based compound; and
 an inorganic salt complex based compound.

12. The method of claim 9, wherein the subsea assembly is one selected from the group consisting of:
 a subsea electrical connector;
 a subsea fiber optic connector;
 a hydraulic communication connector; and
 a remotely operated vehicle intervention panel.

13. The method of claim 9, wherein the subsea assembly is a plug assembly.

14. The method of claim 13, wherein the component of the plug assembly is one selected from the group consisting of:
 a plug body assembly;
 a plug latch release ring; and
 a cable termination.

15. The method of claim 9, wherein the subsea assembly is a receptacle connector.

16. The method of claim 15, wherein the component of the receptacle connector is one selected from the group consisting of:
 a receptacle latch;
 a receptacle liner sleeve; and
 a receptacle body assembly.

* * * * *